United States Patent [19]

Shepherd

[11] Patent Number: 4,920,443
[45] Date of Patent: Apr. 24, 1990

[54] ELECTRICAL PROTECTION ASSEMBLIES

[75] Inventor: Brian Shepherd, Wendover, England

[73] Assignee: Smiths Industries Public Limited Company, London, England

[21] Appl. No.: 427,212

[22] Filed: Oct. 24, 1989

[30] Foreign Application Priority Data

Nov. 25, 1988 [GB] United Kingdom ............... 8827627

[51] Int. Cl.$^5$ .............................................. H02H 9/04
[52] U.S. Cl. ........................................ 361/56; 361/111
[58] Field of Search ................... 361/56, 54, 58, 91, 361/111, 117, 126, 127

[56] References Cited

U.S. PATENT DOCUMENTS

| | | | |
|---|---|---|---|
| 4,559,579 | 12/1985 | Val | 361/56 X |
| 4,635,158 | 1/1987 | Riley | 361/111 |
| 4,635,159 | 1/1987 | Riley | 361/111 |
| 4,729,752 | 3/1988 | Dawson, Jr. et al. | 361/56 X |

Primary Examiner—Todd E. DeBoer
Attorney, Agent, or Firm—Pollock, Vande Sande and Priddy

[57] ABSTRACT

In a multi-conductor electrical assembly, each conductor is connected to a first common electrical plane via first unidirectional current devices and each conductor is further connected to a second common electrical plane via second unidirectional current devices having an opposite sense to the first unidirectional current devices. The assembly includes first and second energy-dissipating devices connected between ground and respective ones of the electrical planes such that an excessive positive or negative voltage excursion on any one of the conductors is conducted via a respective one of the first or second unidirectional current devices to the first or second plane and to ground via the energy-dissipating devices.

10 Claims, 1 Drawing Sheet

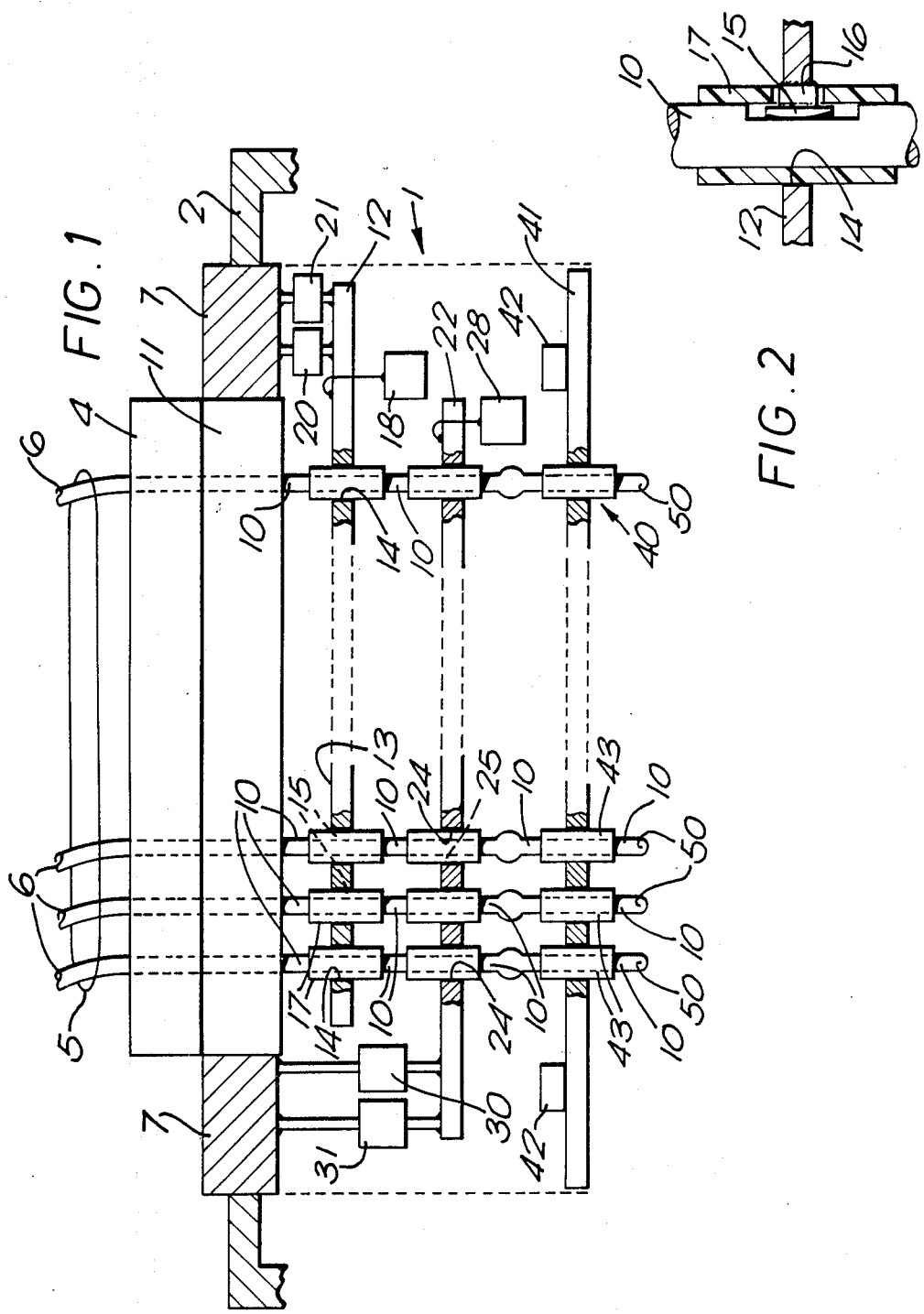

ELECTRICAL PROTECTION ASSEMBLIES

BACKGROUND OF THE INVENTION

This invention relates to electrical protection assemblies.

The invention is more particularly concerned with protection assemblies adapted to prevent damage to associated equipment by high power, transient electrical signals, such as caused by lightning strikes and nuclear electromagnetic pulses (NEMP).

Many components of aircraft, and other vehicle, bodies, previously made of metal, are now being replaced by composite materials, such as carbon fibre reinforced materials. These materials can have great advantages of high strength and low weight but, because they are, in general, electrically non-conductive, they do not provide any significant electrical screening as is conventionally provided by metal panels and the like. This reduction in electrical screening can make electrical equipment in the vehicles more prone to interference produced by external electromagnetic noise. Furthermore, a lightning strike or NEMP can induce a high power signal in the equipment, or in cables connecting equipment, causing damage to it, with possible catastrophic consequences.

Low power electrical interference induced in cables can be reduced readily by filtering, either at the connection of the cable to the equipment casing or within the casing. Examples of such filtering is described in, for example, GB No. 2201050A.

The removal of high power pulses caused by lightning or NEMP causes significantly greater problems, especially where it is necessary to provide electrical protection for each of many conductors connected to a multi-pin connector. A gas-filled tube can be connected between the conductor and ground, the tube becoming conductive by ionisation of the enclosed gas when a high voltage pulse is applied to it. This can be effective against one component of the energy in a lightning strike, commonly known as the slow pulses of around 100 microseconds width but is of little use against the other component, known as the fast pulse which can be around 2 microseconds wide, because the gas does not ionise sufficiently in this time to provide significant conduction. For these faster pulses it is necessary to use voltage-dependent resistance means such as a zener diode, varistor or Tranzorb device which conduct more quickly but which are not rated for as high power dissipation as gas-filled tubes. To give effective protection, therefore, it is necessary to use a parallel arrangement of a gas-filled tube and one of these faster responding devices. Careful matching is necessary to ensure that the gas-filled tube takes over the major part of the power dissipation from the parallel device before the parallel device is damaged by excessive power dissipation through it.

Previously proposed devices for multi-pin connectors have employed a respective gas-filled tube and zener diode, or the like, connected in parallel between each pin and ground. This has lead to a connector of great complexity, bulk, weight and cost. The gas-filled tubes, in particular, tend to be relatively bulky. In most multi-pin connector systems it is physically impossible to accommodate individual conductor protectors which have sufficient energy absorption capability for lightning strikes. Furthermore, the demands upon such built-in lightning arrestors have grown by a factor of ten because of the reduction iniscreening and the increased sensitivity of modern electronic systems.

BRIEF SUMMARY OF THE INVENTION

It is an object of the present invention to provide a multi-conductor protection assembly that can be used to alleviate the above-mentioned problems.

According to one aspect of the present invention there is provided a multi-conductor electrical assembly, each conductor being connected to a first common electrical plane via respective first unidirectional current devices connected between the plane and the respective conductor in the same sense, each conductor being connected to a second common electrical plane via respective second unidirectional current devices connected between the second plane and the conductors in the opposite sense to the first unidirectional current devices, and the assembly including first and second energy-dissipating means connected between ground and respective ones of the electrical planes such that an excessive positive voltage excursion on any one of the conductors is conducted via a respective one of the first unidirectional current devices to the first plane and from the first plane to ground via the first energy-dissipating means, and such that an excessive negative voltage excursion on any one of the conductors is conducted via a respective one of the second unidirectional current devices to the second plane and from the second plane to ground via the second energy-dissipating means.

The assembly preferably includes a first source of positive voltage connected to the first plane to reverse bias the first unidirectional current devices, a second source of negative voltage connected to the second plane to reverse bias the second unidirectional current devices, the voltage of both sources being at least equal to the maximum voltage normally supplied across the conductors but less than that which renders conductive the energy-dissipating means. The first and second sources may be provided by storage capacitors. The energy-dissipating means preferably include gas-discharge means and may include voltage-dependent resistance means which may be connected in parallel with the energy-dissipating means. The voltage-dependent resistance means may be selected from the group consisting of zener diodes, varistors and Transzorbs. The first and second unidirectional current devices are preferably power diodes. The first and second common electrical planes may be provided by respective boards with an electrically-conductive surface. The conductors preferably extend through respective apertures in the boards, the unidirectional current devices being located between each conductor and its respective aperture. The assembly may include r.f. filter means arranged to filter r.f. interference on the conductors.

According to another aspect of the present invention there is provided an electrical connector including an assembly according to the above one aspect of the present invention, at least one end of each conductor being shaped to make a plug-in contact with a respective cooperating conductor in a cooperating connector.

An electrical connector assembly in accordance with the present invention, will now be described, by way of example, with reference to the accompanying drawings.

BRIEF DESCRIPTION OF THE DRAWINGS

FIG. 1 is a sectional side elevation view of the connector; and

FIG. 2 is an enlarged sectional elevation of a part of FIG. 1.

DETAILED DESCRIPTION OF THE PREFERRED EMBODIMENT

The connector 1 is mounted on the face of the casing 2 of electrical equipment (not shown) and receives in mating relationship a co-operating connector 4 such as of the ARINC 600 or 404 type. The connector 4 is mounted at one end of a cable 5 having many individually insulated electrical wires 6 extending along its length. Within the connector 1 extend vertical, rod-shape contact elements or conductors 10, which are insulated from one another by a plastics moulding 11 and which make electrical connection with respective ones of the wires 6. The contact elements 10 at their upper end may be formed with any conventional female socket or male pin that makes plug-in contact with respective contact elements in the connector 4.

Below the insulating moulding 11 extends a first, horizontal board 12 with an electrically highly conductive upper surface 13 which provides a first common electrical plane. The board 12 is itself preferably conductive or it may be insulative, with conductive paths formed along its surface. The board 12 has an array of apertures 14 along its length aligned with respective contact elements 10.

Associated with each aperture 14, there is a silicon power diode 15, as shown in greater detail in FIG. 2. The anode of each diode 15 is soldered directly to an indentation formed in the side of a respective contact element 10 whilst its cathode is soldered to a conducting stud 16. An insulating sleeve 17 surrounds the diode and the region of the contact element which extends through the aperture 14. A hole is formed in the side of the sleeve 17 through which the contact stud 16 extends and makes contact with the edge of the aperture 14 to which it is soldered. The board 12 also supports a gas-discharge tube 20 and voltage-dependent resistance means 21, connected in parallel with one another between the board and a metal casing 7 of the connector 3 which is in turn electrically connected with the conductive casing 2 of the equipment and ground. The gas-discharge tube 20 is capable of taking surge currents of more than 1000 amp with a firing time of approximately 1 microsecond. The voltage-dependent resistance means 21 may be a varistor, zener diode or Tranzorb which has a high resistance at low voltage but rapidly loses resistance at high voltage, providing a low resistance path between the board 12 and ground much more rapidly than the gas-discharge tube 20 but having its non-linear region above the firing voltage of the gas tube. For some applications, both a varistor and a zener diode may be used together, either with a gas-discharge tube or alone, depending on the total energy requirements within the lightning explosive specification of the connector.

A second horizontal board 22 extends parallel to and below the upper board 12 and provides a second common electrical plane. The lower board 22 has an array of apertures 24 that align with the apertures 14 in the upper board 12 and each of which supports a power diode 25 of a similar kind to the diodes 15, but of reverse polarity. The anode of each diode 25 is electrically connected to the lower board 22, and its cathode is electrically connected to respective ones of the contact elements 10 which extend through and project below the lower surface of the board. The lower board 22 similarly supports a parallel arrangement of a gas-discharge tube 30 and voltage-dependent resistance means 31 connected between the board and the casing 7 of the connector 1.

The upper board 12 is connected to a source 18 of positive voltage, whereas the lower board 22 is connected to a source 28 of negative voltage. The voltage of each source 18 and 28 is selected to be equal to, or slightly greater than, the maximum which is normally supplied across conductors 6, but less than that which renders conductive the gas-discharge tubes 20 and 30 or the voltage-dependent resistance means 21 and 31. In this way, the power diodes 15 and 25 are reverse biassed and are non-conductive for normal voltage levels on the conductors 6. The voltage sources 18 and 28 are preferably provided by storage capacitors if the maximum voltage peak on any conductor 6 is an a.c. peak. Other voltage sources could be used and, in some cases these may not be necessary.

Beneath the lower board 22 extends an r.f. filter assembly 40, such as of the kind described in GB2201050A. The assembly 40 comprises a printed circuit board 41 supporting surface-mounted capacitors 42 which are electrically connected between ground and respective sockets 43 which each receive respective ones of the contact elements 10 as a sliding fit.

At their lower end, the contact elements are formed into electric terminations 50 to which electrical conductors can be soldered or otherwise connected.

In normal operation, electrical signals on conductors 6 pass to the contact elements 10 in the connector 1 and are supplied to their respective lower terminations 50, apart from the removal of low-power r.f. noise signals by the filter assembly 40. The diodes 15 and 25 remain non-conductive and thereby isolate each contact element 10 from other contact elements.

If a lightning strike occurs and this induces a high voltage positive signal on any of the conductors 6, the power diode 15 associated with the contact element 10 connected to that conductor will become conductive and thereby connect the contact element to the parallel arrangement of gas-discharge tube 20 and voltage-dependent resistance means 21. The resistance means 21 will become conductive first, supplying the first part of the voltage pulse to ground. The matching of the tube 20 and resistance means 21 is, however, selected such that the tube 20 also becomes conductive for longer duration pulses, taking over the major part of the power dissipation of the resistance means 21. In this way, a fast response is produced by the resistance means 21 but the gas tube 20 prevents it from being damaged because of overheating.

The energy dissipation in the power diode 15, when conducting, is only a small fraction of the total energy, thereby allowing smaller size components to be used which can be accommodated in the small space available.

If the lightning strike produces a negative signal, this causes the diodes 25 on the lower board 22 to become conductive and the signal to be connected to ground via its respective gas tube 30 and resistance means 31.

The parallel arrangement of gas-discharge tube and a faster-responding voltage-dependent resistance means can also give effective protection from oscillating, high-frequency ringing signals produced by NEMP's.

With this assembly it will be seen that only two gas tubes and two zener diodes, or other voltage dependent resistance means, are required for any number of contacts in the connector. Two power diodes are required for each contact but these can be relatively compact compared with gas-discharge devices. The invention, therefore, enables a more compact assembly of low weight and reduced complexity. The compact configuration enables electrical protection of a high level to be provided in assemblies where the close spacing of conductors has previously prevented high energy pulse protection. The invention is not confined to use with connectors but could be used with other multi-conductor assemblies.

Other modifications are possible. For example, the boards 12 and 22 could be sandwiched together and electrically insulated from one another, or a double-sided printed circuit board could be used with the power diodes 15 and 16 surface mounted on the board or the contact elements 10. These boards could replace the insulator block 11.

What I claim is:

1. An electrical assembly comprising: a plurality of electrical conductors; a first common electrical plane; a plurality of first unidirectional current devices connected between the plane and respective ones of the conductors in the same sense; a second common electrical plane; a plurality of second unidirectional current devices connected between said second plane and said conductors in the opposite sense to said first unidirectional current devices; first and second energy-dissipating means; and means connecting said energy-dissipating means between ground and respective ones of the electrical planes such that an excessive positive voltage excursion on any one of the said conductors is conducted via a respective one of said first unidirectional current devices to said first plane and from said first plane to ground via the first energy-dissipating means, and such that an excessive negative voltage excursion on any one of said conductors is conducted via a respective one of said second unidirectional current devices to said second plane and from said second plane to ground via the second energy-dissipating means.

2. An assembly according to claim 1, including a first source of positive voltage, means connecting said first source to said first plane so as to reverse bias the said first unidirectional current devices, a second source of negative voltage, means connecting said second source to said second plane to reverse bias the said second unidirectional current devices, and wherein the voltage of both said sources is at least equal to the maximum voltage normally supplied across the conductors but less than that which renders conductive the said energy-dissipating means.

3. An assembly according to claim 2, wherein the said first and second sources are provided by storage capacitors.

4. An assembly according to claim 1, wherein the said energy-dissipating means include gas-discharge means.

5. An assembly according to claim 1, wherein the said energy-dissipating means include voltage-dependent resistance means.

6. An assembly according to claim 1, wherein the said the energy-dissipating means comprises gas-discharge means, voltage-dependent resistance means and means connecting said voltage-dependent resistance means in parallel with said gas-discharge means.

7. An assembly according to claim 1, wherein the said first and second common electrical planes are provided by respective boards, and wherein said boards both have an electrically-conductive surface.

8. An assembly according to claim 7, wherein both said boards have a plurality of apertures therein, wherein the said conductors extend through respective apertures in both said boards, and wherein the said unidirectional current devices are located between each said conductor and its respective aperture.

9. An assembly according to claim 1, including r.f. filter means, said r.f. filter means being connected to filter r.f. interference on each said conductor.

10. An electrical connector comprising: a plurality of electrical conductors, each said conductor having at least one end shaped to make a plug-in contact with a respective cooperating connector; a first, electrically-conductive board, said first board having a plurality of apertures therein through which extend respective ones of the conductors; a plurality of first unidirectional current devices connected between said first board and respective ones of the conductors in the same sense; a second, electrically-conductive board, said second board having a plurality of apertures therein through which extend respective ones of the conductors; a plurality of second unidirectional current devices connected between said second board and respective ones of the conductors in the opposite sense to said first unidirectional current devices; first and second energy-dissipating means; and means connecting said energy-dissipating means between ground and respective ones of the boards such that an excessive positive voltage excursion on any one of said conductors is conducted via a respective one of the first unidirectional current devices to said first board and from said first board to ground via said first energy-dissipating means, and such that an excessive negative voltage excursion on said conductors is conducted via a respective one of the said second unidirectional current devices to said second board and from said second board to ground via the second energy-dissipating means.

* * * * *